United States Patent
Connell

(10) Patent No.: US 10,713,836 B2
(45) Date of Patent: Jul. 14, 2020

(54) SIMULATING LENSES

(71) Applicant: Microsoft Technology Licensing, LLC, Redmond, WA (US)

(72) Inventor: Trebor Lee Connell, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/017,747

(22) Filed: Jun. 25, 2018

(65) Prior Publication Data
US 2019/0392628 A1  Dec. 26, 2019

(51) Int. Cl.
*G06T 15/06* (2011.01)
*G06T 15/50* (2011.01)

(52) U.S. Cl.
CPC ............ *G06T 15/06* (2013.01); *G06T 15/506* (2013.01); *G06T 2210/56* (2013.01)

(58) Field of Classification Search
None
See application file for complete search history.

(56) References Cited

U.S. PATENT DOCUMENTS

| | | | |
|---|---|---|---|
| 9,124,797 B2 * | 9/2015 | Guenter | H04N 5/3572 |
| 9,137,526 B2 * | 9/2015 | Guenter | H04N 17/002 |
| 9,424,685 B2 | 8/2016 | Howson et al. | |
| 2009/0076754 A1 * | 3/2009 | Bakin | G02B 27/0012 702/81 |
| 2011/0054872 A1 * | 3/2011 | Chen | G06F 17/5009 703/13 |
| 2016/0241791 A1 * | 8/2016 | Narayanswamy | G06T 15/00 |
| 2016/0301922 A1 * | 10/2016 | Green | H04N 17/002 |
| 2018/0158175 A1 * | 6/2018 | Shmunk | G06T 5/002 |

(Continued)

FOREIGN PATENT DOCUMENTS

| | | |
|---|---|---|
| EP | 2442272 A1 | 4/2012 |
| EP | 2687892 A1 | 1/2014 |

OTHER PUBLICATIONS

Rokita, Przemyslaw. "Real-time rendering of optical effects using spatial convolution." Real-Time Imaging III. vol. 3303. International Society for Optics and Photonics, 1998. (Year: 1998).*

(Continued)

*Primary Examiner* — Ryan M Gray
(74) *Attorney, Agent, or Firm* — Alleman Hall Creasman & Tuttle LLP

(57) ABSTRACT

Examples are disclosed that relate to computing devices and methods for simulating light passing through one or more lenses. In one example, a method comprises obtaining a point spread function of the one or more lenses, obtaining a first input raster image comprising a plurality of pixels, and ray tracing the first input raster image using the point spread function to generate a first output image. Based on ray tracing the first input raster image, a look up table is generated by computing a contribution to a pixel in the first output image, wherein the contribution is from a pixel at each location of a subset of locations in the first input raster image. A second input raster image is obtained, and the look up table is used to generate a second output image from the second input raster image.

20 Claims, 8 Drawing Sheets

(56) References Cited

U.S. PATENT DOCUMENTS

| | | | | |
|---|---|---|---|---|
| 2018/0343432 A1* | 11/2018 | Duan | ............... | G01S 7/497 |
| 2019/0122378 A1* | 4/2019 | Aswin | ............... | G06T 7/571 |

OTHER PUBLICATIONS

Small, Alex, et al. "Enhancing diffraction-limited images using properties of the point spread function." Optics express 14.8 (2006): 3193-3203. (Year: 2006).*

Li, Yang, et al. "Simulation of depth from coded aperture cameras with Zennax." Proceedings of the 10th International Conference on Virtual Reality Continuum and Its Applications in Industry. ACM, 2011. (Year: 2011).*

Shih, Yichang, Brian Guenter, and Neel Joshi. "Image enhancement using calibrated lens simulations." European Conference on Computer Vision. Springer, Berlin, Heidelberg, 2012. (Year: 2012).*

"Optical transfer function", Retrieved from: https://en.wikipedia.org/wiki/Optical_transfer_function, Retrieved on Feb. 21, 2018, 13 Pages.

"Ray tracing (graphics)", Retrieved from: https://en.wikipedia.org/wiki/Ray_tracing_(graphics), Retrieved on Feb. 21, 2018, 11 Pages.

"Rendering (computer graphics)", Retrieved from: https://en.wikipedia.org/wiki/Rendering_(computer_graphics)#Scanline_rendering_and_rasterisation, Retrieved on Feb. 21, 2018, 14 Pages.

Cabeleira, Joao, "Combining Rasterization and Ray Tracing Techniques to Approximate Global Illumination in Real-Time", Retrieved from: https://pdfs.semanticscholar.org/008d/6628e0787a95b802dae28546593078d4ab7a.pdf, Oct. 2010, 10 Pages.

Hormann, et al., "A Quadrilateral Rendering Primitive", In Proceedings of the ACM SIGGRAPH/EUROGRAPHICS Symposium on Graphics Hardware, Aug. 29, 2004, pp. 7-14.

Kugler, Anders, "The Setup for Triangle Rasterization", In Proceedings of workshop on Graphics Hardware, Aug. 26, 1996, pp. 49-58.

Mavridis, Pavlos, "Efficient Texture Representation and Sampling Algorithms for Real-time Rendering", In Dissertation of Athens University of Economics & Business, Apr. 2013, pp. 1-192.

Sabino, et al., "A Hybrid GPU Rasterized and Ray Traced Rendering Pipeline for Real Time Rendering of Per Pixel Effects", In Proceedings of 11th International Conference on Entertainment Computing, Sep. 26, 2012, pp. 209-305.

Short, et al., "Image Capture Simulation Using an Accurate and Realistic Lens Model", In Proceedings of IS&T/SPIE Conference on Sensors, Cameras, and Applications for Digital Photography, vol. 3650, Mar. 22, 1999, pp. 138-148.

Sugerman, Jeremy, "Ray Tracing with Existing Graphics Systems", Retrieved from: https://graphics.stanford.edu/~yoel/notes/060131-rt+raster-flashg.ppt, Jan. 31, 2006, pp. 1-23.

Barsky, et al., "Introducing Vision-Realistic Rendering", In Proceedings of the Thirteenth Eurographics Workshop on Rendering, Jun. 26, 2002, 7 Pages.

Hach, et al., "Cinematic Bokeh Rendering for Real Scenes", In Proceedings of the 12th European Conference on Visual Media Production, Nov. 24, 2015, 10 Pages.

"International Search Report and Written Opinion Issued in PCT Application No. PCT/US19/036220", dated Oct. 25, 2019, 19 Pages.

* cited by examiner

SIMULATING LENSES

BACKGROUND

Ray tracing can generate accurate images by calculating how light travels through optical systems, such as lenses or mirrors. However, ray tracing can be computationally expensive and may take a long time to simulate effects of such optical systems on large numbers of images.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to computing devices and methods for simulating light passing through one or more lenses. In one example, a method comprises at a precomputing stage, obtaining a point spread function of the one or more lenses and obtaining a first input raster image comprising a plurality of pixels. The first input raster image is ray traced using the point spread function to generate a first output image.

The method generates a look up table based on ray tracing the first input raster image by computing a contribution to a pixel in the first output image, wherein the contribution is from a pixel at each location of a subset of locations in the first input raster image. At a runtime stage, a second input raster image comprising a plurality of pixels is obtained, and using the look up table the method generates a second output image from the second input raster image.

DETAILED DESCRIPTION

A wide variety of devices may utilize optical systems that process and/or generate light to produce images. Examples of such devices include cameras, microscopes, head-mounted displays, illumination systems, and the like. Simulating the output of such optical systems using computer-generated images may be helpful in variety of situations.

For example, in some devices such as mixed reality head-mounted display (HMD) devices, cognitive algorithms may be utilized to perform image-based localization and/or other tasks. Such algorithms may be trained using sets of images representing an environment in which the HMD device is located. In some examples, image-processing algorithms may be trained using actual images captured from a prototype of an image capture device or other optical hardware implemented along with the algorithms. However, it may be difficult to maintain sufficient production consistency of end user devices for the prototype's training to be valid for every device produced.

As such, it may be desirable to train cognitive algorithms on sets of simulated images that simulate a view of a scene from the image capture device. Generating images of real or simulated scenes also may be useful in a variety of other examples, including cinematography and gaming.

In some examples, effects of viewing an image via a lens, prism, mirror or other optical hardware may be simulated using reference physical parameters of the optical hardware. For example, a simulated view through a lens may be generated by ray tracing how light will travel inside the lens based on given parameters. For example, the parameters may include a point spread function describing how light spreads when it passes through the lens.

Ray tracing using parameters such as a point spread function may generate accurate simulations of optical systems. However, ray tracing is computationally expensive and requires a long time to simulate the effects of an optical system on large numbers of images. For example, ray tracing a single image for some optical systems may take 10 minutes or longer. Further, in some examples an image-processing algorithm may be trained on sets of thousands to millions of images. As such, it may be inordinately time-consuming and expensive to ray trace an entire set of images. Further, ray tracing may process each image at a much slower rate than a frame rate at which images are obtained. As such, processed images may not be fed directly into applications requiring many frames to be processed at or near a frame capture rate.

Figure 1:
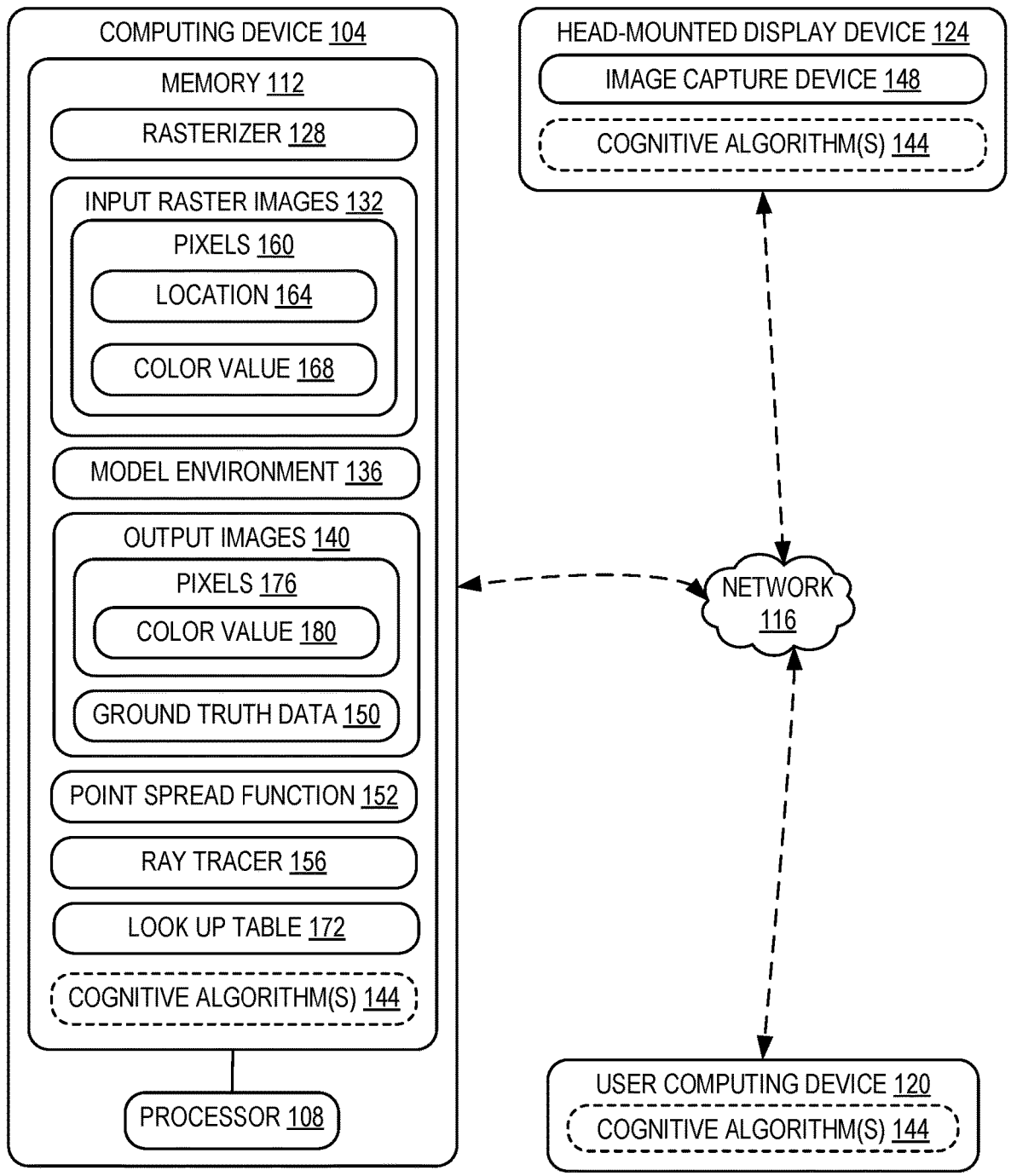
FIG. 1 shows a block diagram illustrating an example system for simulating light passing through one or more lenses according to examples of the present disclosure.

Accordingly, examples are disclosed that relate to computing devices and methods for simulating light passing through one or more lenses. With reference now to FIG. 1, in one example a computing device 104, such as a network server, may comprise a processor 108 and a memory 112 holding instructions executable by the processor 108 to simulate light passing through one or more lenses as described herein. In different examples the computing device 104 may comprise a desktop, laptop or tablet computer, mobile computing device, mobile communication device (e.g., smart phone), and/or other computing device. Additional details regarding the components and computing aspects of the computing device 104 are described in more detail below with reference to FIG. 7.

As described in more detail below regarding FIG. 2, the computing device 104 may be communicatively coupled via network 116 with various user devices, such as a user computing device 120 or a head-mounted display (HMD) device 124. As described below, in some examples the computing device 104 may host a remote service that simulates light passing through one or more lenses as described herein.

For example, in FIG. 1, the user computing device 120 or the HMD device 124 may request that computing device 104 process a plurality of images to simulate the effect of viewing the images through one or more lenses or other optical system. In some examples, the computing device 104 may obtain a plurality of images from the user computing device 120. For example, the user computing device 120 may upload the images or provide a link to the images at a location on the network 116 or the Internet.

The computing device 104 may comprise a rasterizer 128, which may convert each image of the plurality of images into an input raster image 132. In other examples, the user computing device 120 may select a plurality of input raster images 132 already stored by the computing device 104.

In yet another example, discussed in more detail below, the user computing device 120 may request that computing device 104 generate a plurality of input raster images 132 from a model environment 136. The model environment 136 may comprise one or more predetermined three-dimensional worlds from which environment images may be generated.

In the example of FIG. 1, the computing device 104 may generate a plurality of output images 140 that may be used to train or validate performance of one or more cognitive algorithms 144. As illustrated in dashed blocks in FIG. 1, the cognitive algorithm(s) 144 may be implemented and/or stored on the user computing device 120, computing device 104, or other devices such as the HMD device 124.

In some examples, the HMD device 124 may use the cognitive algorithm(s) 144 to process image data from an image capture device 148. For example, the HMD device 124 may feed image data from the image capture device 148 to the cognitive algorithm(s) 144 to determine its location and orientation with respect to a real-world environment by analyzing the image data.

As described above, in some examples developers may desire a set of images to train or validate the cognitive algorithm(s) 144. In some examples, a developer may log into a service provided by the computing device 104 from the user computing device 120. In some examples, the developer may select a simulated model environment 136 from which the set of images may be generated. For example, as illustrated in FIG. 2, the simulated model environment 136 may comprise a simulated three-dimensional model of a room 200. The developer may then request images of the room 200 from one or more specified perspectives.

For example, the developer may define or select a path 204 from one or more pre-defined paths that simulate the positions and orientations of an HMD device 208 worn by a virtual user 212 walking around the room 200. The path 204 may describe the position and the orientation of the simulated HMD device 208 at a specified frame rate, such as 24 data frames per second, as the HMD device 208 progresses along the path 204.

With reference again to FIG. 1, the rasterizer 128 may generate one or more input raster images 132 that simulate a view of the room 200 from a perspective of the HMD device 208 at given positions and orientations along the path 204. In different examples, the rasterizer 128 may generate the input raster images 132 for a computer-generated film, video game, virtual or mixed reality application, etc.

Figure 2:
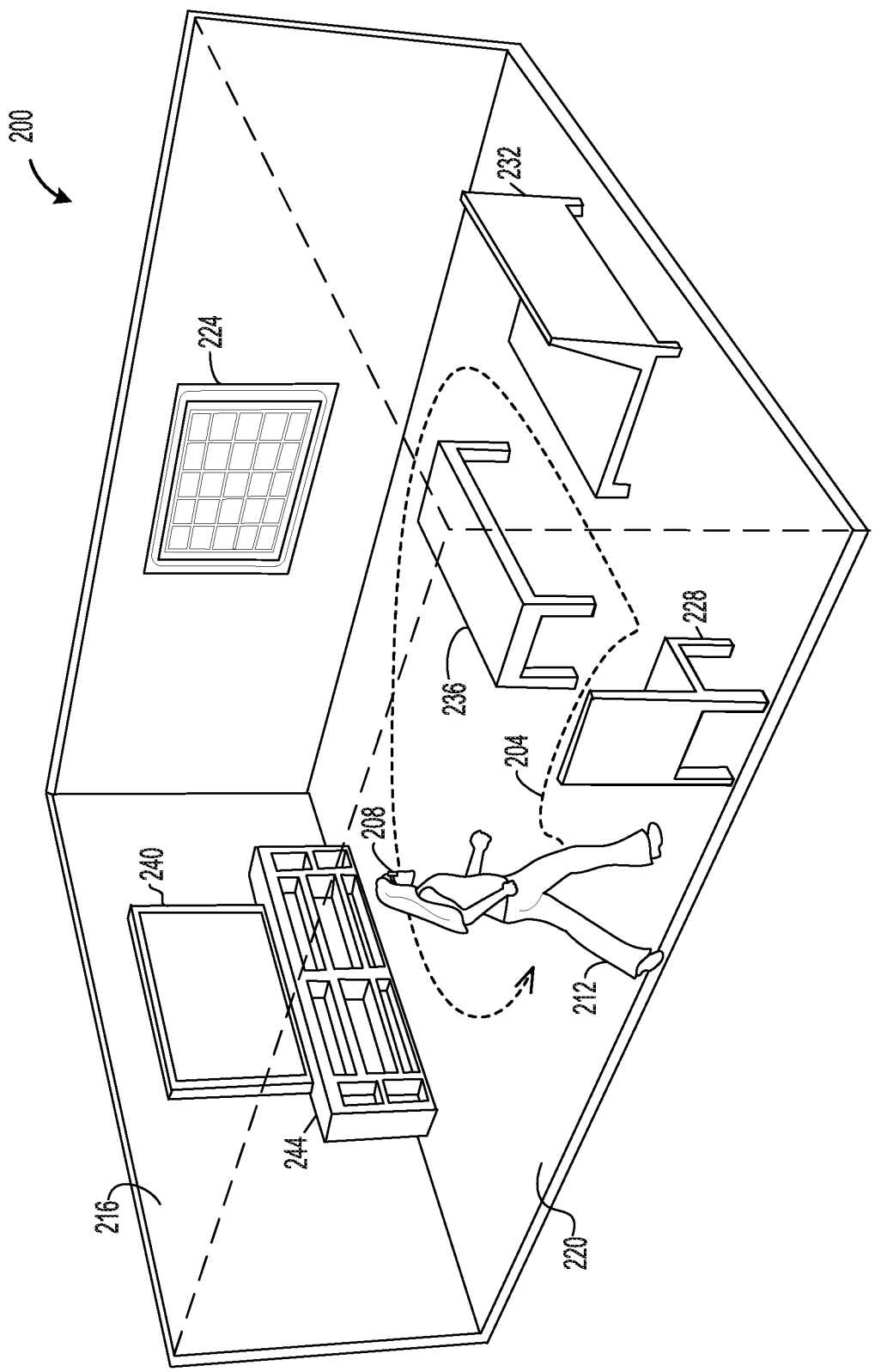
FIG. 2 is an illustrative example of a use case scenario in which a computing device simulates images of a model environment according to examples of the present disclosure.

For example, in FIG. 2, the room 200 may comprise a three-dimensional mesh that models walls 216, floor 220, window 224, and other objects within the room 200 such as chair 228, couch 232, table 236, television 240 and shelf 244. In other examples, the room 200 may comprise a combination of three-dimensional shape and surface models, textures, depth values, light sources, and any other data that may be used to suitably generate images of a scene within the room 200.

Model environments 136, such as the room 200, also may comprise ground truth data 150 describing at least a portion of the model environment 136. For example, the room 200 may comprise depth data, orientation data, and/or identification data of objects and surfaces within the room 200. In one example, ground truth data 150 may comprise a label corresponding to a location within the room 200 that identifies the table 236. These ground-truth data 150 may be provided along with the output images 140 to describe the portion of the model environment 136 depicted in each output image 140. In one example, ground-truth data 150 may be provided in an image file's metadata description.

Ground-truth data 150 may be desirable for training the cognitive algorithm(s) 144 or validating an algorithm's performance by checking an output of the algorithm against the ground truth data. For example, an image-recognition cognitive algorithm may output "table" in response to processing an output image 140 of the room 200. A developer may check the ground truth data and determine that the cognitive algorithm correctly recognized the table 236.

In some examples involving an image capture device, the developer also may describe one or more optical systems of the image capture device so that images of the room 200 may be generated with proper distortions to accurately simulate images captured via the image capture device. For example, the developer may provide a point spread function 152 of one or more lenses, as described in more detail below regarding FIG. 4. In other examples, the computing device 104 may apply a pre-determined model of a lens, such as in cases when the developer may refrain from providing a point spread function.

Using the point spread function 152, the computing device 104 may utilize a ray tracer 156 to ray trace a first input raster image 132 and generate a first output image 140. Next, the computing device 104 may generate a look up table 172 based on ray tracing the first input raster image 132. For example, the first input raster image 132 may comprise a plurality of pixels 160. Each pixel of the plurality of pixels 160 may have a discrete location 164 within the image and a color value 168.

As described in more detail below, the computing device 104 may select a subset of the pixels 160 in the input raster image 132 to populate the look up table 172. For each pixel 160 in this subset of pixels, a contribution to a color value 180 or other value of each pixel in the first output image 140 may be computed. In this manner and for each pixel 160 in the subset of pixels in the input raster image 132, the look up table 172 may map the pixel's computed contribution to each pixel 176 in the first output image 140. Using these computed contributions in the look up table 172, the color value 180 for each pixel 176 in the output image 140 may be determined. In some examples, generating the look up table 172 as described above may be performed at a pre-computing stage.

As described in more detail below, the computing device 104 may receive additional input raster images for processing, such as a second input raster image, third input raster image, etc. Accordingly, and in one potential advantage of the present disclosure, a second output image, third output image and/or additional output images may be generated, respectively, using the look up table 172. In this manner, the additional time requirements and computational expense of ray-tracing each additional image may be avoided.

Figure 3:
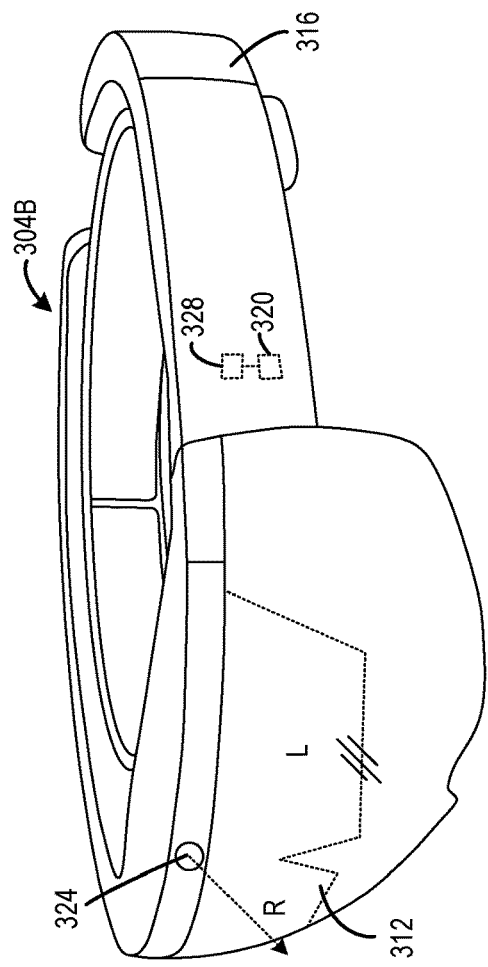
FIG. 3 shows two examples of head-mounted display devices according to examples of the present disclosure.
Figure 3:
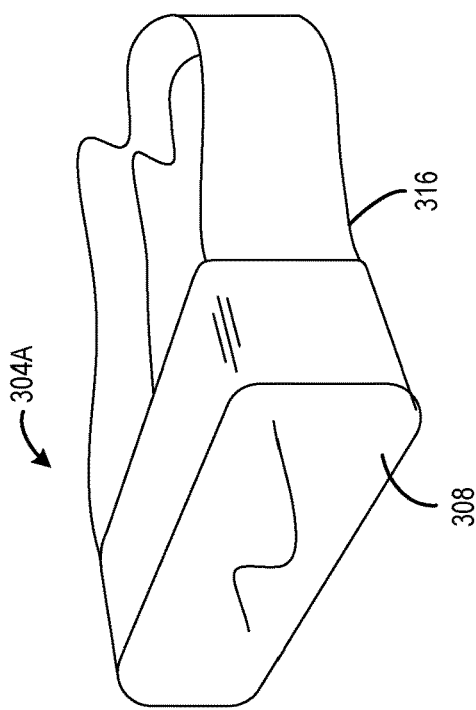

With reference now to FIG. 3, and as described above, in some examples aspects of the present disclosure may be practiced by an HMD device that may take a variety of forms. For example, HMD device 124 may take the form of a virtual reality HMD device 304A that includes an opaque, non-see-through display 308. Another example of an HMD device is an augmented reality HMD device 304B that comprises an at least partially transparent display 312 that is configured to enable a wearer of the augmented reality HMD device to view physical, real-world objects in the physical environment through one or more partially transparent pixels displaying virtual object representations. It will be appreciated that the following descriptions of sensors and systems may apply to both the augmented reality HMD device 304B and the virtual reality HMD device 304A.

In the example of FIG. 3, each of the example HMD devices 304A and 304B has a construction that includes a frame 316 that wraps around the head of a user to position a display close to the user's eyes. The frame of virtual reality HMD device 304A may include a rigid portion and an elastic portion, whereas the frame 316 of augmented reality HMD device 304B may be substantially rigid around its circumference. The frame 316 may support additional components such as, for example, a processor 320 and an input device 324. The processor 320 may include logic and associated computer memory 328 configured to run a cognitive algorithm 144, to simulate light passing through one or more lenses, to interact with computing device 104 and/or user computing device 120 or other computing devices, to receive and process sensor data from input device 324, and/or to enact various other processes described herein. It will be appreciated that the processor 320 may include a logic processor and the two example HMD devices 304A and 304B may include volatile memory and non-volatile storage, as discussed in more detail below with respect to the example computing system 700 of FIG. 7.

With continued reference to FIG. 3, the input device 324 may include various sensors and related systems to provide information to the processor 320. Such sensors may include one or more image sensor(s). The one or more outward facing image sensor(s) may be configured to capture and/or measure physical environment attributes of the physical environment in which the augmented reality HMD device 304B is located. In one example, the one or more image sensor(s) may include a visible-light camera configured to collect a visible-light image of a physical space. The visible-light camera may comprise one or more optical systems, such as lenses, prisms or mirrors, configured to collect the visible light image.

In one example of the augmented reality HMD device 304B that includes the transparent display 312, a position and/or orientation of the augmented reality HMD device 304B relative to the physical environment may be assessed so that augmented-reality images may be accurately displayed in desired real-world locations with desired orientations. In both augmented reality HMD device 304B and virtual reality HMD device 304A, the image sensor(s) may be configured to provide image data to the cognitive algorithm 144, which may process the image data to generate a three-dimensional model of the physical environment and determine the position and/or orientation of the augmented reality HMD device 304B or virtual reality HMD device 304A.

Figure 4:
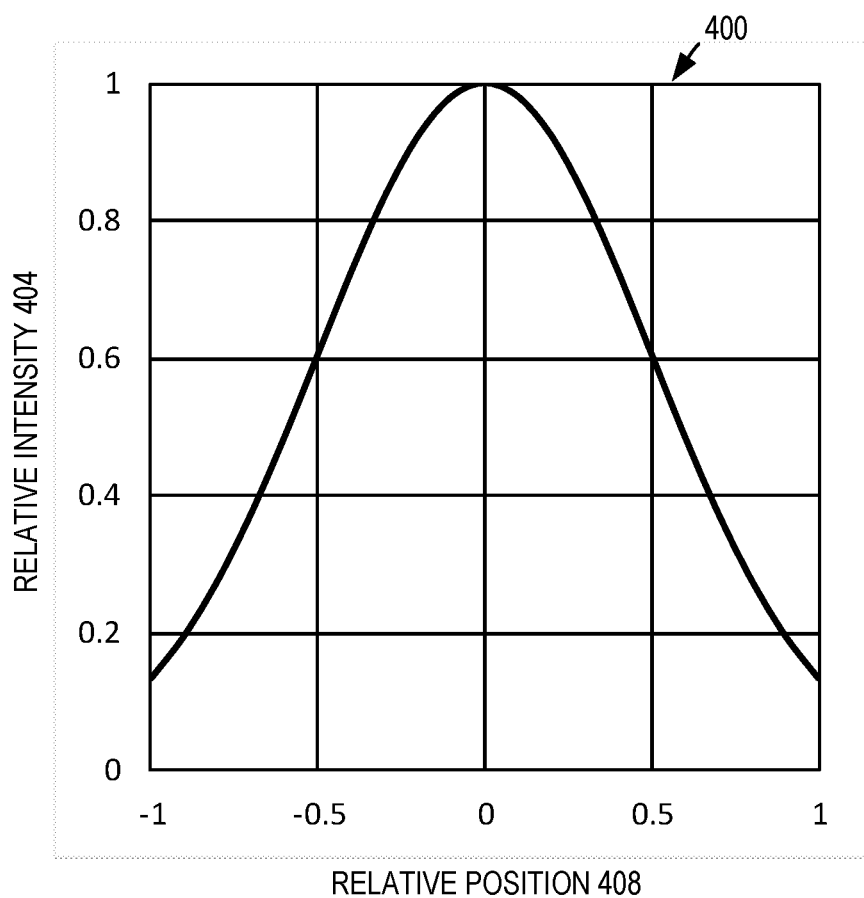
FIG. 4 is an illustrative example of a point spread function according to examples of the present disclosure.

With reference now to FIG. 4, and as mentioned above, it may be desirable to simulate distortions introduced into one or more images by an optical system, such as lenses of the image sensor(s) of HMD devices. As described above, distortions and aberrations introduced by such optical systems may be modeled using a point spread function 152 that describes how light spreads when it passes through a lens.

FIG. 4 illustrates one example of a point spread function 400 of a lens. In the example of FIG. 4, the point spread function 400 is modeled as a Gaussian function with a standard deviation of 0.5 that illustrates a relative intensity 404 of light focused at a pixel as it spreads out, or blurs, after passing through the lens. The x-axis of the point spread function 400 is the relative position 408 to the pixel along an axis of an output image 140.

It will be appreciated that FIG. 4 illustrates the point spread function 400 as a two-dimensional function for simplicity, but that the point spread function 400 may also be applied to each axis of an image. For example, the point spread function 400 may be applied symmetrically to both an x- and y-axis of an image, or different point spread functions may be applied to each axis. In other examples, the point spread function 400 may be modeled by more complex functions, such as a three-dimensional Airy function, or may be modified to more accurately model optical aberrations of the lens. In yet other examples, different pixels of an output image 140 may have different point spread functions.

In some examples, a numerical input/output table may be used in place of, or in combination with, the point spread function 152 to describe how light spreads when passing through a lens. For example, an input/output table may be generated by shining a laser through one or more lenses and using an image sensor to detect the light after it passes through the lens. The image sensor may comprise a plurality of pixels, and may report a location of each pixel that absorbs the light, and the intensity of the light at said pixel(s). Like a point spread function, this information also may be used to simulate distortions introduced by the lens.

With reference again to FIG. 1 and as described above, using the point spread function 152 a first input raster image 132 may be ray traced to generate a first output image 140. In some examples, the ray tracer 156 may process the first input raster image 132 as a high-resolution pinhole image. For example, the pinhole image may have a resolution of 4000×3000 pixels, 12000×8000 pixels, or any other suitable resolution.

The ray-tracer 156 may project each pixel of the first input raster image 132 on a first side of a simulated lens onto a first output image 140 on an opposing side of the simulated lens by calling the point spread function 152 for every point. In another example, an input/output table may be called instead of the point spread function 152 to generate the first output image 140. It will also be appreciated that interpolation or any other suitable method may be used to project each pixel of the first input raster image 132 onto the output image 140. For example, mathematics used to generate the first output image 140 may be simplified, such as by using an analytical model for distortion in place of ray-tracing refraction of the simulated lens. In these examples, the first output image may be generated using a simplified line to plane calculation.

Next, the look up table 172 may be populated by mapping each pixel of the first input raster image 132 that contributes to each pixel of the first output image 140, and by computing how much each pixel of the first input raster image 132 contributes to each pixel of the first output image 140. For example, a contribution from each pixel of the first input raster image 132 to each pixel of the first output image 140 may comprise a weighted contribution value, such as 0.3 or 30%. It will also be appreciated that, in other examples, the look up table 172 may be populated or initialized using one or more images other than the first input raster image.

As previously mentioned, a look up table may specify one or more pixels at a subset of one or more locations in a first input raster image, with each such pixel of the subset contributing to each pixel of a first output image. For example, each output image of an image set may comprise 640×480 pixels. The subset of locations in the first input raster image may comprise locations of 512 different pixels in the first input raster image.

In one example, the look up table may comprise 512 entries for each pixel of the 640×480 pixels of the first output image. Each entry in the look up table may comprise a location of a pixel in the first input raster image and a contribution value from that pixel to a pixel of the first output image. In other examples, the look up table may utilize other quantities of entries for each pixel of an output image, such as 256, 1024, or other quantity.

If parameters such as the resolution and dimensions of each image and camera intrinsic parameters such as focal length and distortion remain unchanged, a pixel at a given location in an input raster image may contribute a same amount to a given pixel in an output image each time the input raster image is ray traced, regardless of the input raster image's content. For example, a pixel in an upper left corner of an input raster image may consistently project to a lower right corner in a corresponding output image each time the input raster image is ray traced. However, as the content of the input raster images changes, a color of a pixel at a given location in a first input raster image may not be the same as the color of the pixel at the same given location in a second input raster image.

Accordingly, in one potential advantage of the present disclosure, a color value of a given pixel in a second output image 140 may be computed using the contribution values that have been precomputed for the subset of locations in the first input raster image 132. For example, a color of a given pixel in a second input raster image may be determined at each location of the subset of locations. As described above, the look up table 172 may specify the contribution from the pixel in the first input raster image at each location of the subset of locations. This contribution may be combined with the color of the pixel in the second input raster image. Accordingly and as described in more detail below, in some examples and at a runtime stage, a second input raster image comprising a plurality of pixels may be obtained. Using the look up table 172, a second output image may be generated from the second input raster image.

Figure 5A:
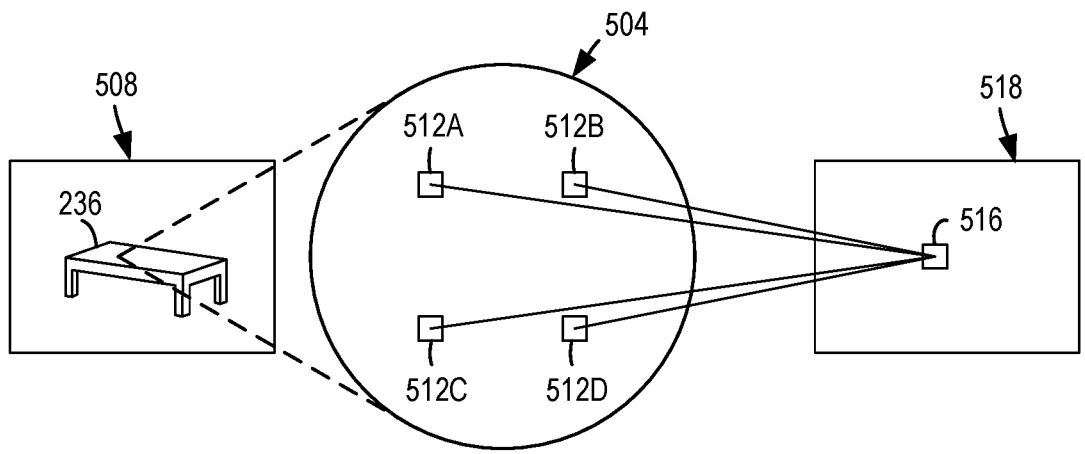
FIG. 5A illustrates a contribution from each pixel of a subset of pixels of an input raster image to a pixel in an output image according to examples of the present disclosure.

For example, FIG. 5A illustrates a subset 504 of pixels enlarged from a first input raster image 508 of the table 236 of FIG. 2. In the example of FIG. 5A, the subset 504 comprises pixels 512A, 512B, 512C and 512D. Based on ray tracing the first input raster image 508, it may be determined that pixels 512A, 512B, 512C and 512D each contribute to a color of a pixel 516 in a first output image 518.

It will be appreciated that pixels 512A, 512B, 512C, and 512D each correspond to a different location in the first input raster image 508. Pixel 516 corresponds to a location in the first output image 518. As such, pixels 512A, 512B, 512C, 512D and 516 as they are discussed herein may be present at the same location in each respective input or output image. Additionally, pixels 512A, 512B, 512C, 512D and 516 as they are discussed herein may have a different color among a first image, second image, third image, and/or additional images as each image's content changes.

In the example of FIG. 5A, pixels 512A, 512B, 512C and 512D may have different colors in the first input raster image 508 than at corresponding locations in a second input raster image. Accordingly, pixel 516 may have a different color in the first output image 518 as compared to a second output image generated from a second, different input raster image.

For example, the color of the pixel 516 in a second output image may be determined by mixing the colors of pixels 512A, 512B, 512C and 512D in the second input raster image according to a weighted contribution value from each pixel. The weighted contribution value may be computed by ray tracing the first input raster image 508 to generate the first output image 518, as discussed above, and saved in look up table 172.

In one example, the colors of pixels 512A, 512B, 512C and 512D in the first input raster image 508 may contribute 30%, 20%, 25%, and 25%, respectively, to the color of the pixel 516 in the first output image 518. Accordingly, the look up table 172 may specify that pixels 512A, 512B, 512C and 512D have weighted contributions of 0.30, 0.20, 0.25, and 0.25, respectively, to pixel 516. It will be appreciated that these weighted contributions are provided by way of example. In other examples, weighted contribution values may not add to 100%, as relative illumination and quantum efficiency may prevent 100% of incoming light from being recorded in a final image.

In this example, a second input raster image may be obtained in which pixels 512A, 512B, 512C and 512D may have different color values than in the first input raster image 508. However, the pre-computed weighted contribution values from each pixel 512A, 512B, 512C and 512D of the subset 504 of pixels of the first input raster image 508 to pixel 516 in the first output image 518 are saved in look up table 172. Accordingly, these pre-computed contributions may be used to compute the color of pixel 516 in the second output image. For example, the color of the pixel 516 may be computed by mixing the colors of pixels 512A, 512B, 512C and 512D in the second input raster image in a ratio of 30%, 20%, 25%, and 25%, respectively, which is the same ratio in which these pixels contribute to pixel 516 in the first output image 518.

It will be appreciated that the subset 504 of pixels may comprise a different number of pixels in other examples, such as up to every pixel in the first input raster image 508. However, not every pixel of an input raster image may have a meaningful contribution to each pixel of an output image. Accordingly, a look up table 172 may be simplified by selectively saving contributions from a subset of pixels of an input raster image that contribute most to each pixel of an output image. In one example, the subset may comprise the 512 pixels of a first input raster image that have the highest-weighted contributions to each pixel in a first output image as compared to the other pixels of the first input raster image. In other examples, the subset may comprise a different number of pixels, such as 256, 1024, etc. In some examples, one of a plurality of subsets that have different number of pixels may be utilized for one or more pixels in the first output image.

Further, a graphics processing unit (GPU) may be configured to use the look up table 172 to process images faster than one or more central processing unit (CPU) cores. For example, a GPU may implement one or more texture filters that may accelerate image processing. In the example of FIG. 1, processor 108 of computing device 104 may comprise a GPU. In some examples, the GPU may comprise a bilinear filter that may be utilized to determine a color value of a given pixel in an output image. For example, the bilinear filter may be configured to look up and combine two color values of two pixels in an input raster image with two contributions to the given pixel from the two pixels in the input raster image. It will be appreciated that bilinear filtering and other methods discussed herein also may be implemented on a CPU or other suitable processor.

Figure 5B:
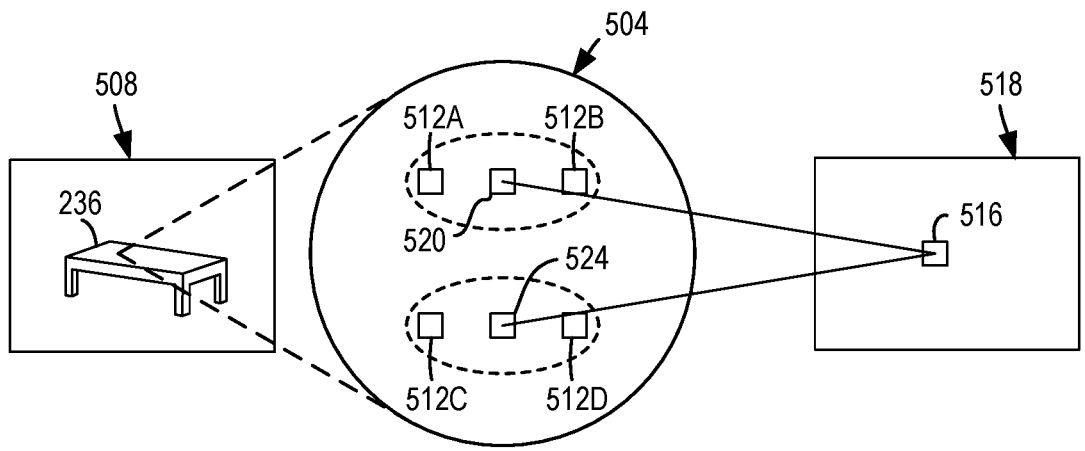
FIG. 5B is an illustrative example of combining contributions from two pixels of a subset of pixels according to examples of the present disclosure.

FIG. 5B shows an example of how a bilinear filter may be applied to combine contributions from two pixels. In the example of FIG. 5B, the bilinear filter may interpolate a color value of a virtual pixel 520 using the weighted contributions of pixels 512A and 512B. As described above, pixels 512A and 512B may have weighted contributions of 0.3 and 0.2, respectively. Accordingly, the color value of the virtual pixel 520 may be determined by mixing the colors of pixels 512A and 512B in a ratio of 60% to 40%, respectively.

The bilinear filter also may interpolate a color value of virtual pixel 524 using the weighted contributions of pixels 512C and 512D. As described above, pixels 512C and 512D may have weighted contributions of 0.25 and 0.25, respectively. Accordingly, the color value of the virtual pixel 524 may be determined by mixing the colors of pixels 512C and 512D in a 1:1 ratio.

In this example, the virtual pixels 520 and 524 may be combined in a 1:1 ratio to yield the same color for pixel 516 as in the example of FIG. 5A. In other examples, the virtual pixels 520 and 524 may be mixed with different weights and/or in different ratios. In some examples, using the bilinear filter to combine contributions from two pixels may approximately halve the computational expense of computing the color of pixel 516.

In some examples, output images may be generated in real-time or close to real-time. In one example, a look up table 172 may be populated as described above, such as by ray tracing a first input raster image. Once the look up table 172 is populated, additional input raster images may be obtained at a frame rate. For example, the additional input raster images may stream directly from an image capture device, a database or an image generator. Advantageously, by utilizing the processes described herein, additional output images corresponding to each of the additional input raster images may be generated at approximately the same frame rate by simply calling the look up table 172 as described above. In this manner, output images may be generated in real-time, which may further enable production of image sets at scale and may enable interactivity between consequent frames of an image set.

In some examples, bilinear filters may bias an output image by including contributions from pixels outside the subset of highest-weighted pixels. Even a small bias that may be imperceptible to a human observer may negatively impact a cognitive algorithm. Accordingly, in some examples, bias may be reduced by instructing the GPU to sample pixels in a pattern, such as a square or a circle.

In some examples, the bilinear filter may combine the contribution of a pixel with that of its highest weighted neighbor. In the example of FIG. 5B, pixel 512A has a weight of 0.3. Adjacent pixels 512B and 512C have weights of 0.2 and 0.25, respectively. Accordingly, the bilinear filter may combine pixel 512A with its highest weighted neighbor pixel 512C. In yet other examples, pixels may be combined about a default axis, and the default axis may be switched randomly or at a preset rate (e.g. to combine pixels 512A/512C and pixels 512B/512D instead of pixels 512A/512B and pixels 512C/512D). It will be appreciated that pixels may be processed in any other suitable manner to reduce bias.

Figure 6A:
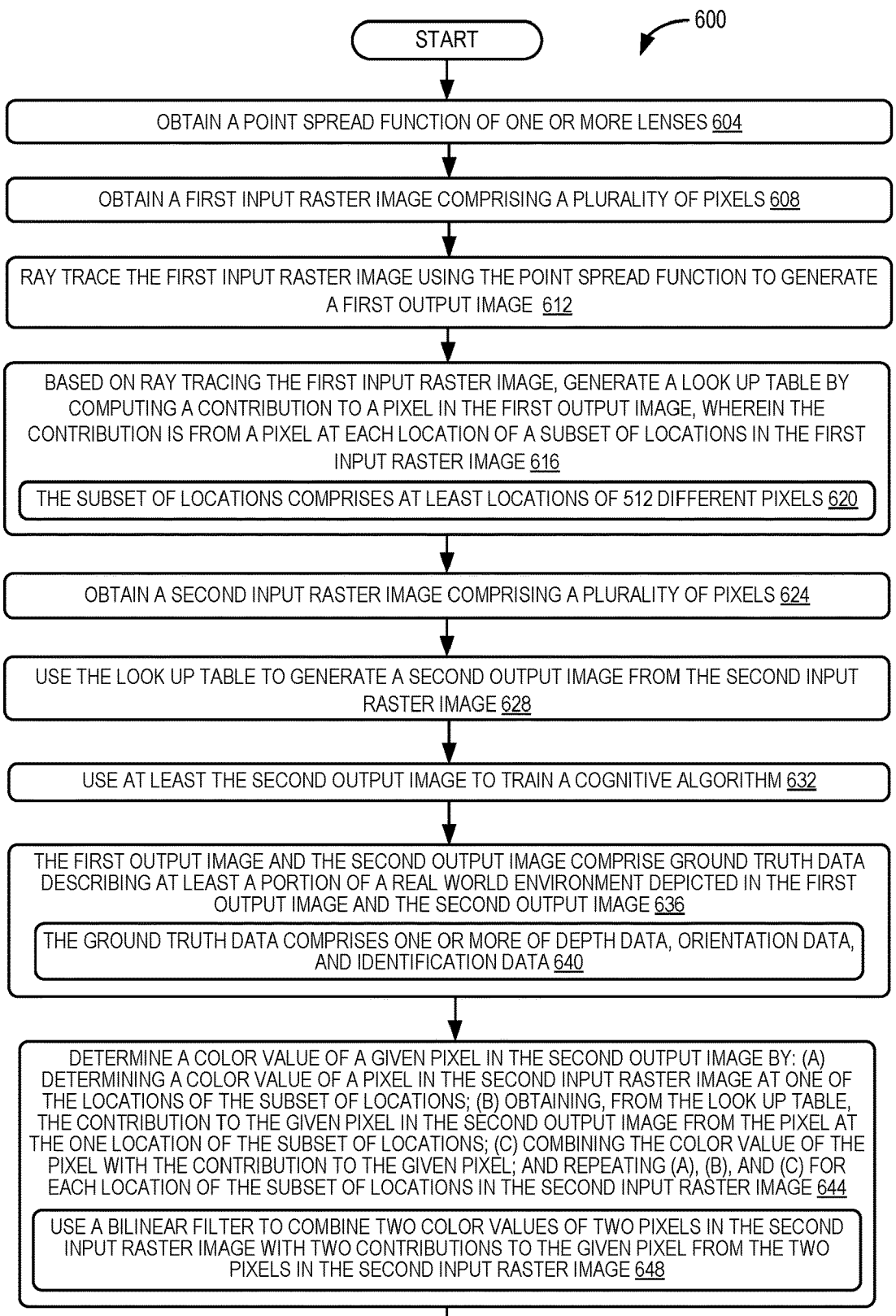
FIGS. 6A and 6B are a flow chart of an example method for simulating light passing through one or more lenses.
Figure 6B:
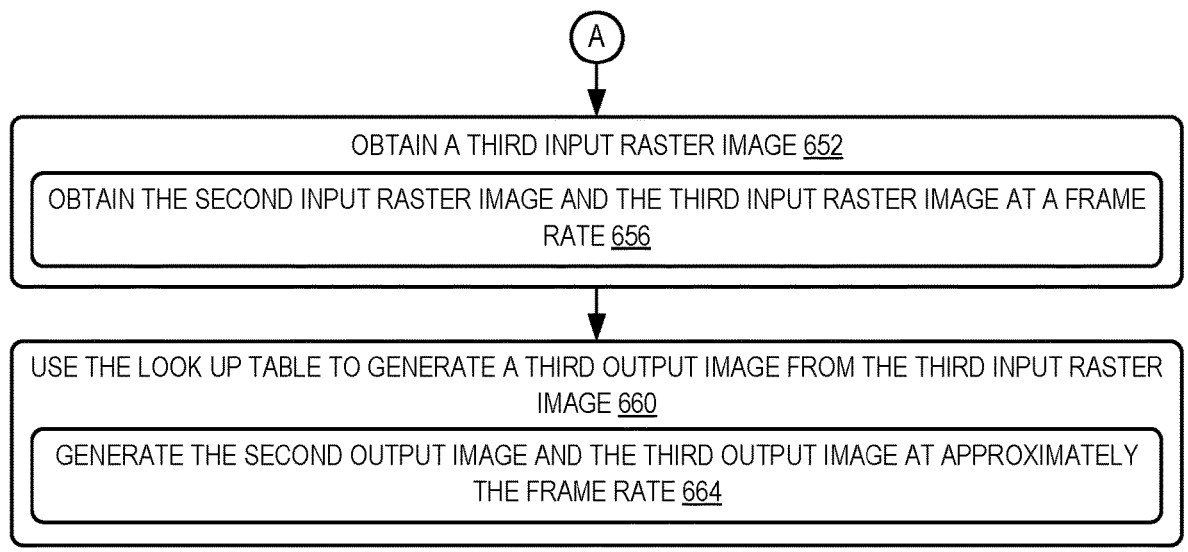

With reference now to FIGS. 6A-6B, a flow chart is illustrated of an example method 600 for simulating light passing through one or more lenses. The following description of method 600 is provided with reference to the software and hardware components described herein and shown in FIGS. 1-5 and 7. It will be appreciated that method 600 also may be performed in other contexts using other suitable hardware and software components.

With reference to FIG. 6A, at 604, the method 600 may include, at a precomputing stage, obtaining a point spread function of the one or more lenses. At 608, the method 600 may include obtaining a first input raster image comprising a plurality of pixels. At 612, the method 600 may include ray tracing the first input raster image using the point spread function to generate a first output image.

At 616, the method 600 may include, based on ray tracing the first input raster image, generating a look up table by computing a contribution to a pixel in the first output image, wherein the contribution is from a pixel at each location of a subset of locations in the first input raster image. At 620, the method 600 may include, wherein the subset of locations comprises locations of at least 512 different pixels.

At 624, the method 600 may include, at a runtime stage, obtaining a second input raster image comprising a plurality of pixels. At 628, the method 600 may include using the look up table to generate a second output image from the second input raster image. At 632, the method 600 may include using at least the second output image to train a cognitive algorithm. At 636, the method 600 may include, wherein the first output image and the second output image comprise ground truth data describing at least a portion of a real world environment depicted in the first output image and the second output image. At 640, the method 600 may include, wherein the ground truth data comprise one or more of depth data, orientation data, and identification data.

At 644, the method 600 may include determining a color value of a given pixel in the second output image by: (a) determining a color value of a pixel in the second input raster image at one of the locations of the subset of locations; (b) obtaining, from the look up table, the contribution to the given pixel in the second output image from the pixel at the one location of the subset of locations; (c) combining the color value of the pixel with the contribution to the given pixel; and repeating the processes (a), (b), and (c) above for each location of the subset of locations in the second input raster image. At 648, the method 600 may include, wherein determining the color of the pixel comprises using a bilinear filter to combine two color values of two pixels in the second input raster image with two contributions to the given pixel from the two pixels in the second input raster image.

With reference to FIG. 6B, at 652, the method 600 may include obtaining a third input raster image. At 656, the method 600 may include, wherein obtaining the second input raster image and the third input raster image comprises obtaining the second input raster image and the third input raster image at a frame rate. At 660, the method 600 may include using the look up table to generate a third output image from the third input raster image. At 664, the method 600 may include, wherein generating the second output image and the third output image comprises generating the second output image and the third output image at approximately the frame rate.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
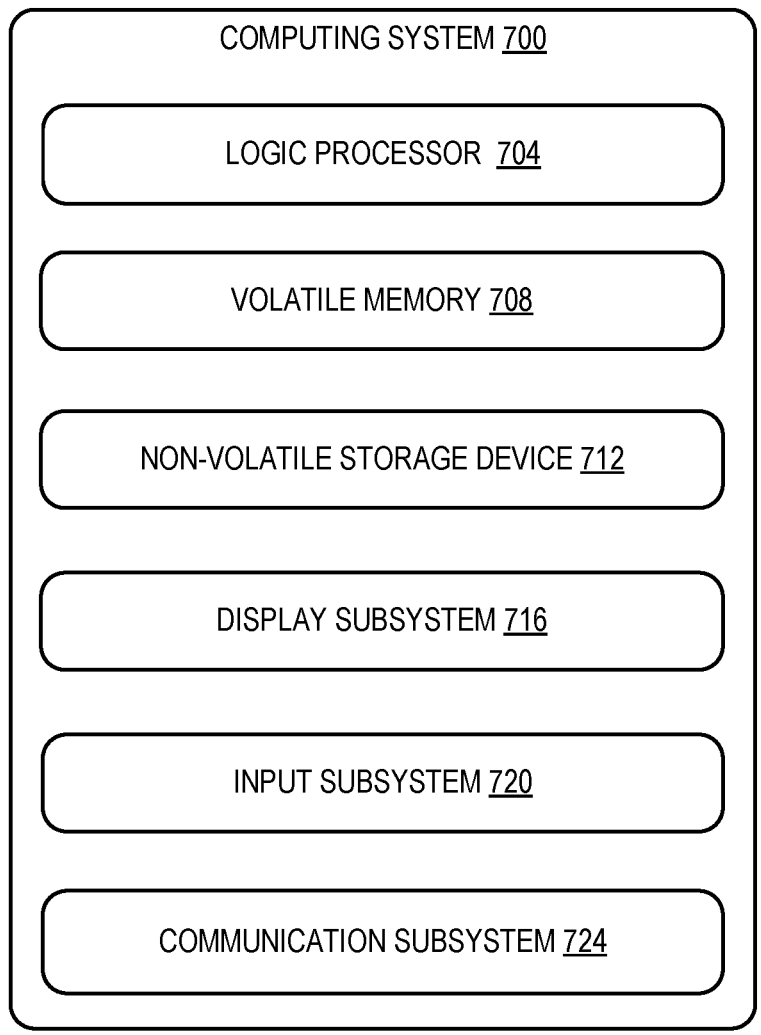
FIG. 7 shows a block diagram of a computing system according to examples of the present disclosure.

FIG. 7 schematically shows a non-limiting embodiment of a computing system 700 that can enact one or more of the methods and processes described above. Computing system 700 is shown in simplified form. Computing system 700 may take the form of one or more gaming consoles, personal computers, server computers, tablet computers, home-entertainment computers, network computing devices, gaming devices, mobile computing devices, mobile communication devices (e.g., smart phones), and/or other computing devices, including wearable computing devices such as smart wristwatches and head mounted display devices. In the above examples, computing device 104, user computing device 120, HMD device 124, HMD device 208 and HMD devices 304A and 304B may comprise computing system 700 or one or more aspects of computing system 700.

Computing system 700 includes a logic processor 704, volatile memory 708, and a non-volatile storage device 712. Computing system 700 may optionally include a display subsystem 716, input subsystem 720, communication subsystem 724 and/or other components not shown in FIG. 7.

Logic processor 704 includes one or more physical devices configured to execute instructions. For example, the logic processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 704 may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 704 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 712 includes one or more physical devices configured to hold instructions executable by the logic processors to implement the methods and processes described herein. When such methods and processes are implemented, the state of non-volatile storage device 712 may be transformed—e.g., to hold different data.

Non-volatile storage device 712 may include physical devices that are removable and/or built-in. Non-volatile storage device 712 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 712 may include nonvolatile, dynamic, static, read/write, read-only, sequential-access, location-addressable, file-addressable, and/or content-addressable devices. It will be appreciated that non-volatile storage device 712 is configured to hold instructions even when power is cut to the non-volatile storage device 712.

Volatile memory 708 may include physical devices that include random access memory. Volatile memory 708 is typically utilized by logic processor 704 to temporarily store information during processing of software instructions. It will be appreciated that volatile memory 708 typically does not continue to store instructions when power is cut to the volatile memory 708.

Aspects of logic processor 704, volatile memory 708, and non-volatile storage device 712 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "program" and "application" may be used to describe an aspect of computing system 700 typically implemented in software by a processor to perform a particular function using portions of volatile memory, which function involves transformative processing that specially configures the processor to perform the function. Thus, a program or application may be instantiated via logic processor 704 executing instructions held by non-volatile storage device 712, using portions of volatile memory 708. It will be understood that different programs and/or applications may be instantiated from the same application, service, code block, object, library, routine, API, function, etc. Likewise, the same program and/or application may be instantiated by different applications, services, code blocks, objects, routines, APIs, functions, etc. The terms "program" and "application" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 716 may be used to present a visual representation of data held by non-volatile storage device 712. As the herein described methods and processes change the data held by the non-volatile storage device, and thus transform the state of the non-volatile storage device, the state of display subsystem 716 may likewise be transformed to visually represent changes in the underlying data. Display subsystem 716 may include one or more display devices utilizing virtually any type of technology. Such display devices may be combined with logic processor 704, volatile memory 708, and/or non-volatile storage device 712 in a shared enclosure, or such display devices may be peripheral display devices.

When included, input subsystem 720 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 724 may be configured to communicatively couple various computing devices described herein with each other, and with other devices. Communication subsystem 724 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 700 to send and/or receive messages to and/or from other devices via a network such as the Internet.

The following paragraphs provide additional support for the claims of the subject application. One aspect provides a method for simulating light passing through one or more lenses, the method comprising: at a precomputing stage: obtaining a point spread function of the one or more lenses; obtaining a first input raster image comprising a plurality of pixels; ray tracing the first input raster image using the point spread function to generate a first output image; and based on ray tracing the first input raster image, generating a look up table by computing a contribution to a pixel in the first output image, wherein the contribution is from a pixel at each location of a subset of locations in the first input raster image; at a runtime stage: obtaining a second input raster image comprising a plurality of pixels; and using the look up table to generate a second output image from the second input raster image. The method may additionally or alternatively include using at least the second output image to train a cognitive algorithm. The method may additionally or alternatively include, wherein the first output image and the second output image comprise ground truth data describing at least a portion of a real world environment depicted in the first output image and the second output image. The method may additionally or alternatively include, wherein the ground truth data comprise one or more of depth data, orientation data, and identification data. The method may additionally or alternatively include, obtaining a third input raster image; using the look up table to generate a third output image from the third input raster image; wherein obtaining the second input raster image and the third input raster image comprises obtaining the second input raster image and the third input raster image at a frame rate; and wherein generating the second output image and the third output image comprises generating the second output image and the third output image at approximately the frame rate. The method may additionally or alternatively include, determining a color value of a given pixel in the second output image by: (a) determining a color value of a pixel in the second input raster image at one of the locations of the subset of locations; (b) obtaining, from the look up table, the contribution to the given pixel in the second output image from the pixel at the one location of the subset of locations; (c) combining the color value of the pixel with the contribution to the given pixel; and repeating the processes (a), (b), and (c) above for each location of the subset of locations in the second input raster image. The method may additionally or alternatively include, wherein determining the color value of the given pixel comprises using a bilinear filter to combine two color values of two pixels in the second input raster image with two contributions to the given pixel from the two pixels in the second input raster image. The method may additionally or alternatively include, wherein the subset of locations comprises locations of at least 512 different pixels.

Another aspect provides a computing device for simulating light passing through one or more lenses, comprising: a processor; and a memory holding instructions executable by the processor to, obtain a point spread function of the one or more lenses; obtain a first input raster image comprising a plurality of pixels; ray trace the first input raster image using the point spread function to generate a first output image; based on ray tracing the first input raster image, generate a look up table by computing a contribution to a pixel in the first output image, wherein the contribution is from a pixel at each location of a subset of locations in the first input raster image; obtain a second input raster image comprising a plurality of pixels; and use the look up table to generate a second output image from the second input raster image. The computing device may additionally or alternatively include, wherein the instructions are further executable by the processor to use at least the second output image to train a cognitive algorithm. The computing device may additionally or alternatively include, wherein the first output image and the second output image comprise ground truth data describing at least a portion of a real world environment depicted in the first output image and the second output image. The computing device may additionally or alternatively include, wherein the ground truth data comprises one or more of depth data, orientation data, and identification data. The computing device may additionally or alternatively include, wherein the instructions are further executable by the processor to: obtain a third input raster image; use the look up table to generate a third output image from the third input raster image; wherein obtaining the second input raster image and the third input raster image comprises obtaining the second input raster image and the third input raster image at a frame rate of an image capture device; and wherein generating the second output image and the third output image comprises generating the second output image and the third output image at approximately the frame rate. The computing device may additionally or alternatively include, wherein the instructions are further executable by the processor to determine a color value of a given pixel in the second output image by: (a) determining a color value of a pixel in the second input raster image at one of the locations of the subset of locations; (b) obtaining, from the look up table, the contribution to the given pixel in the second output image from the pixel at the one location of the subset of locations; (c) combining the color value of the pixel with the contribution to the given pixel; and repeating the processes (a), (b) and (c) above for each location of the subset of locations in the second input raster image. The computing device may additionally or alternatively include, wherein the instructions are further executable by the processor to use a bilinear filter to combine two color values of two pixels in the second input raster image with two contributions to the given pixel from the two pixels in the second input raster image. The computing device may additionally or alternatively include, wherein the subset of locations comprises locations of at least 512 different pixels.

Another aspect provides a computing device for simulating light passing through one or more lenses, comprising: a processor; and a memory holding instructions executable by the processor to, obtain a point spread function of the one or more lenses; obtain a first input raster image; generate a pinhole image from the first input raster image, the pinhole image comprising a plurality of pixels; ray trace the pinhole image using the point spread function to generate a first output image; based on ray tracing the pinhole image, generate a look up table by computing a contribution to a pixel in the first output image, wherein the contribution is from a pixel at each location of a subset of locations in the first input raster image; obtain additional input raster images at a frame rate; and use the look up table to generate additional output images from the additional input raster images at approximately the frame rate. The computing device may additionally or alternatively include, wherein the instructions are further executable by the processor to use at least the additional output images to train a cognitive algorithm. The computing device may additionally or alternatively include, wherein the instructions are further executable by the processor to determine a color value of a given pixel in the second output image by: (a) determining a color value of a pixel in the second input raster image at one of the locations of the subset of locations; (b) obtaining, from the look up table, the contribution to the given pixel in the second output image from the pixel at the one location of the subset of locations; (c) combining the color value of the pixel with the contribution to the given pixel; and repeating the processes (a), (b) and (c) above for each location of the subset of locations in the second input raster image. The computing device may additionally or alternatively include, wherein the instructions are further executable by the processor to use a bilinear filter to combine two color values of two pixels in the additional input images with two contributions to the given pixel from the two pixels in the second input raster image.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for simulating light passing through one or more lenses, the method comprising:
   at a precomputing stage:
      obtaining a point spread function of the one or more lenses;
      obtaining a first input raster image comprising a plurality of pixels representing a real or model environment;
      ray tracing the first input raster image using the point spread function to generate a first output image; and
      based on ray tracing the first input raster image, generating a look up table by computing a contribution to a pixel in the first output image, wherein the contribution is from a pixel at each location of a subset of locations in the first input raster image;
   at a runtime stage:
      obtaining a second input raster image comprising a plurality of pixels; and
      using the look up table to generate a second output image from the second input raster image.

2. The method of claim 1, further comprising using at least the second output image to train a cognitive algorithm.

3. The method of claim 1, wherein the first output image and the second output image comprise ground truth data describing at least a portion of the real or model environment depicted in the first output image and the second output image.

4. The method of claim 3, wherein the ground truth data comprise one or more of depth data, orientation data, and identification data.

5. The method of claim 1, further comprising:
   obtaining a third input raster image;
   using the look up table to generate a third output image from the third input raster image;
   wherein obtaining the second input raster image and the third input raster image comprises obtaining the second input raster image and the third input raster image at a frame rate; and
   wherein generating the second output image and the third output image comprises generating the second output image and the third output image at approximately the frame rate.

6. The method of claim 1, further comprising determining a color value of a given pixel in the second output image by:
   (a) determining a color value of a pixel in the second input raster image at one of the locations of the subset of locations;
   (b) obtaining, from the look up table, the contribution to the given pixel in the second output image from the pixel at the one location of the subset of locations;
   (c) combining the color value of the pixel with the contribution to the given pixel; and
   repeating the processes (a), (b), and (c) above for each location of the subset of locations in the second input raster image.

7. The method of claim 6, wherein determining the color value of the given pixel comprises using a bilinear filter to combine two color values of two pixels in the second input raster image with two contributions to the given pixel from the two pixels in the second input raster image.

8. The method of claim 1, wherein the subset of locations comprises locations of at least 512 different pixels.

9. A computing device for simulating light passing through one or more lenses, comprising:
   a processor; and
   a memory holding instructions executable by the processor to,
      obtain a point spread function of the one or more lenses;
      obtain a first input raster image comprising a plurality of pixels representing a real or model environment;
      ray trace the first input raster image using the point spread function to generate a first output image;
      based on ray tracing the first input raster image, generate a look up table by computing a contribution to a pixel in the first output image, wherein the contribution is from a pixel at each location of a subset of locations in the first input raster image;
      obtain a second input raster image comprising a plurality of pixels; and
      use the look up table to generate a second output image from the second input raster image.

10. The computing device of claim 9, wherein the instructions are further executable by the processor to use at least the second output image to train a cognitive algorithm.

11. The computing device of claim 9, wherein the first output image and the second output image comprise ground truth data describing at least a portion of the real or model environment depicted in the first output image and the second output image.

12. The computing device of claim 11, wherein the ground truth data comprises one or more of depth data, orientation data, and identification data.

13. The computing device of claim 9, wherein the instructions are further executable by the processor to:
  obtain a third input raster image;
  use the look up table to generate a third output image from the third input raster image;
  wherein obtaining the second input raster image and the third input raster image comprises obtaining the second input raster image and the third input raster image at a frame rate of an image capture device; and
  wherein generating the second output image and the third output image comprises generating the second output image and the third output image at approximately the frame rate.

14. The computing device of claim 9, wherein the instructions are further executable by the processor to determine a color value of a given pixel in the second output image by:
  (a) determining a color value of a pixel in the second input raster image at one of the locations of the subset of locations;
  (b) obtaining, from the look up table, the contribution to the given pixel in the second output image from the pixel at the one location of the subset of locations;
  (c) combining the color value of the pixel with the contribution to the given pixel; and
  repeating the processes (a), (b) and (c) above for each location of the subset of locations in the second input raster image.

15. The computing device of claim 14, wherein the instructions are further executable by the processor to use a bilinear filter to combine two color values of two pixels in the second input raster image with two contributions to the given pixel from the two pixels in the second input raster image.

16. The computing device of claim 9, wherein the subset of locations comprises locations of at least 512 different pixels.

17. A computing device for simulating light passing through one or more lenses, comprising:
  a processor; and
  a memory holding instructions executable by the processor to,
    obtain a point spread function of the one or more lenses;
    obtain a first input raster image;
    generate a pinhole image from the first input raster image, the pinhole image comprising a plurality of pixels representing a real or model environment;
    ray trace the pinhole image using the point spread function to generate a first output image;
    based on ray tracing the pinhole image, generate a look up table by computing a contribution to a pixel in the first output image, wherein the contribution is from a pixel at each location of a subset of locations in the first input raster image;
    obtain additional input raster images at a frame rate; and
    use the look up table to generate additional output images from the additional input raster images at approximately the frame rate.

18. The computing device of claim 17, wherein the instructions are further executable by the processor to use at least the additional output images to train a cognitive algorithm.

19. The computing device of claim 17, wherein the instructions are further executable by the processor to determine a color value of a given pixel in the second output image by:
  (a) determining a color value of a pixel in the second input raster image at one of the locations of the subset of locations;
  (b) obtaining, from the look up table, the contribution to the given pixel in the second output image from the pixel at the one location of the subset of locations;
  (c) combining the color value of the pixel with the contribution to the given pixel; and
  repeating the processes (a), (b) and (c) above for each location of the subset of locations in the second input raster image.

20. The computing device of claim 19, wherein the instructions are further executable by the processor to use a bilinear filter to combine two color values of two pixels in the additional input images with two contributions to the given pixel from the two pixels in the second input raster image.

* * * * *